Dec. 14, 1965   N. S. KAPANY   3,223,009
HIGH SPEED PHOTOGRAPHIC APPARATUS
Filed Oct. 1, 1962   3 Sheets-Sheet 1
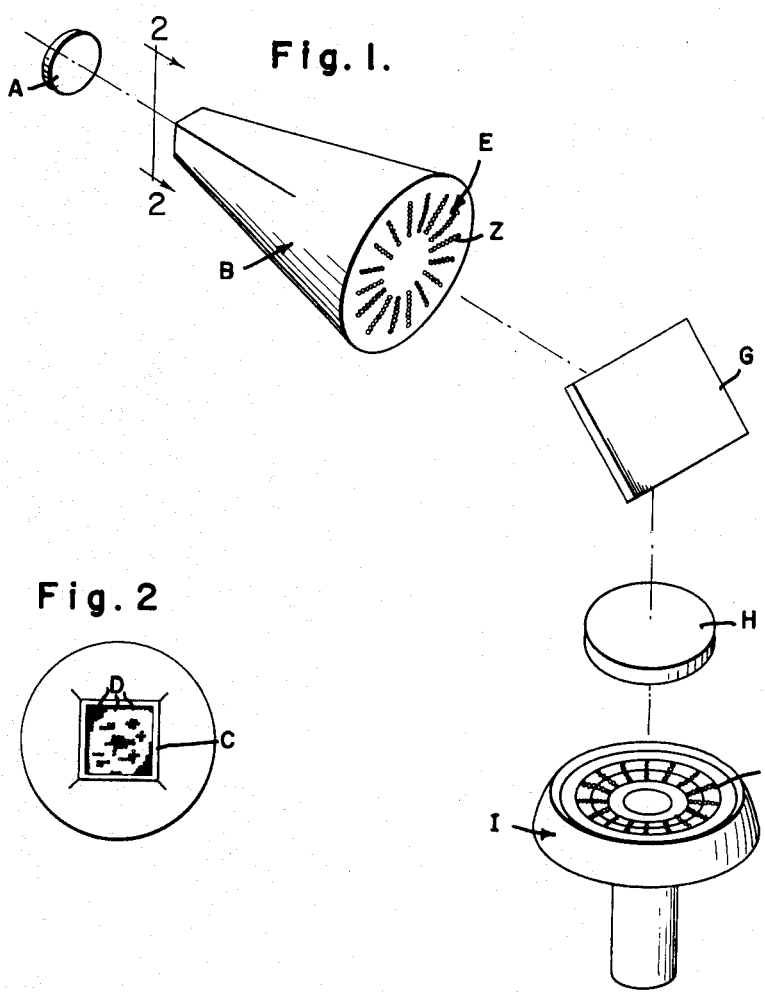
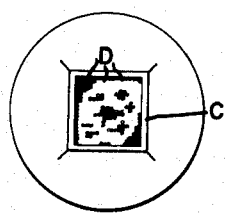
INVENTOR.
Narinder S. Kapany
BY
Townsend and Townsend
attorneys INVENTOR.
Narinder S. Kapany United States Patent Office  3,223,009
Patented Dec. 14, 1965

3,223,009
HIGH SPEED PHOTOGRAPHIC APPARATUS
Narinder S. Kapany, Woodside, Calif., assignor to Optics Technology, Inc., Belmont, Calif., a corporation of California
Filed Oct. 1, 1962, Ser. No. 227,601
11 Claims. (Cl. 95—11)

This invention relates to a high resolution photographic apparatus for photographing and the reconstructing of an ultra-high speed event.

In ultra-high speed photography there are four basic criteria which determine the effectiveness of the photographic apparatus: namely (1) the temporal resolution, (2) the spatial resolution and total number of pictorial information elements (3) the number of picture frames, and (4) the effective $f$-ratio of the optical system.

In the past, various high speed camera systems of different designs have been satisfactorily employed; however, they have failed to provide high spatial and temporal resolution as well as a large number of frames and pictorial information elements simultaneously. In photographic apparatus in which the ultra-high speed event is reconstructed at a much slower speed the spatial resolution and number of pictorial information elements become increasingly more important.

The principal objects of this invention are to provide apparatus for continuously photographing a high speed event over a predetermined time interval.

In this invention the image of the event is dissected into a sequence of information bearing channels which is continuously photographed by projecting the sequence on a film plane with the film areas between adjacent projected information bearing channels forming film spaces on each of which an information channel image is photographed during the interval the sequence image is scanned along the film plane.

The device of this invention will photograph a high speed event with extreme speed to record the event in the form of completely independent segments along a film plane and which will thereafter collate the segments for viewing or photographing the record at a much slower speed with excellent retention of resolution.

A further feature and advantage of this invention is that the quality and quantity of information that can be recorded is enhanced by a structure and method which will allow high spatial resolution and a large number of pictorial information elements.

Another object of the present invention is to provide such a photographic apparatus wherein the information bearing channels at the matrix output end are substantially equally spaced around a circle on a flat, film plate positioned on a transparent film table rotatable about an axis perpendicular to the flat surface thereof. The flat film is more easily mounted and supported on a flat film table than on a cylindrical drum as used previously and affords superior dynamic balance and therefore better resolution.

Other objects of the present invention will become apparent on reading the following specification and referring to the accompanying drawings in which similar characters of reference represent corresponding parts in each of the several views.

In the drawings:

FIG. 1 is a diagrammatic perspective view of a preferred embodiment of the invention.

FIG. 2 is an end view of a portion of the structure shown in FIG. 1 taken along the plane 2—2 looking in the direction of the arrows.

Figure 3:
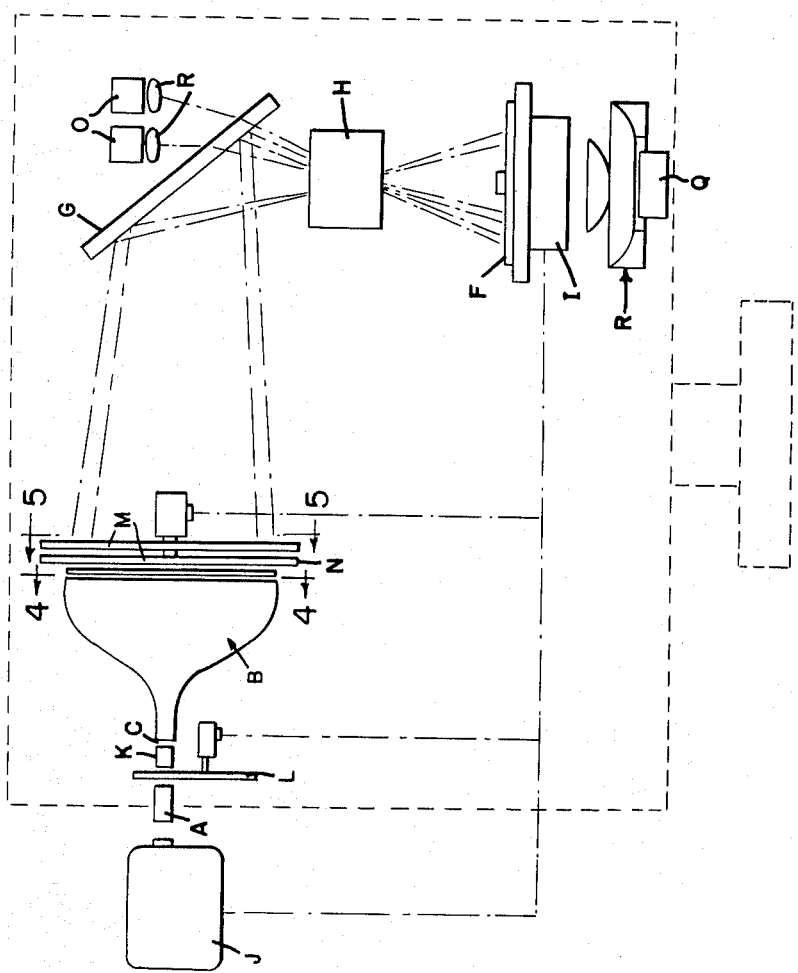
FIG. 3 is a side diagrammatic view of a complete photographic instrument embodying the structure illustrated in FIG. 1.

Referring now to the drawing and with particular reference to FIGS. 1 and 2, there is shown a schematic view of a photographic apparatus for photographing and reconstructing an ultra-high speed event. An objective lens A forms an image of a high speed event taking place (not shown) onto the small input end C of a light transmitting matrix B. The matrix B comprises an image dissector formed of a bundle of light transmitting fibers D which are preferably arranged at the matrix input end C in rows and columns to form a rectangle although any pattern forming plain figures such as a square or circle can be used.

At the large end E of the matrix B the fibers D are arranged in a sequence of information bearing channels Z, each one fiber wide and equally spaced across the surface thereof. As shown at the large end E the fibers D lie on channels on radii of a circle, the inner ends of the channels terminating short of the center of the circle whereby the fibers lie in an annular area.

The image dissector fibers D are made of glass or other transparent material having a relatively high index of refraction which is surrounded with a coating having a low refractive index and are described generally in the article by Narinder S. Kapany entitled "Fiber Optics" in the November 1960 issue of Scientific American at pages 72–81.

The arrangement of a rectangular to radial image dissector described above permits the use of a multitude of fibers D for photographing an ultra-high speed event with extremely high resolution. A typical image dissector of this type is made up of hundreds of thousands of fibers.

The image formed on the small end C of the matrix is transmitted through the fibers D to the large end E to produce what appears to be a meaningless image thereon. This image is then directed onto a flat film plate F by means of an optical system consisting of, for example, a mirror G and reimaging lens H. The film plate F is positioned on the transparent portion of a film holder table I which is rotatable about an axis perpendicular to surface supporting the film plate.

The film holder table I is placed at the short conjugate of the lens thus reducing the apparent fiber size to aid in improving the temporal resolution with a smaller film plate diameter and lower plate rotational velocity.

As the film holder table I is rapidly rotated the event taking place will be continuously photographed by the projection of the sequence of information bearing channels Z onto the film plane of the film table I until the film table I has been rotated an angular distance equal to the angular spacing between the channels Z on the matrix B. A shutter (not shown) which is open the length of time it takes the rotating table to move through this angular distance prevents a double exposure.

Although it is desirable to have the axis of the film holder table I perpendicular to the axis of the matrix B for the reason that the film is mounted and rotated in a horizontal plane, it is obvious that the film holder table I could rotate about an axis coincident with that of the matrix B and the table I positioned either directly adjacent the large end E of the matrix B or spaced therefrom with a reimaging lens positioned therebetween.

To reconstruct the event photographed the developed film plate F is positioned on the transparent film holder table I and a printing light source (not shown) located below the table I turned on to project the image from the film plate back through the reimaging lens H, off the mirror G, and onto the large end E of the matrix B. The image is then transmitted by the fibers to the small end C of the matrix for display.

Referring now to FIG. 3 there is shown a complete schematic view of a photographic apparatus embodying the present invention. When a high speed event is to be photographed, a 16 millimeter reconstruction camera J is removed, and the camera system directed toward the field to be photographed. Framing and focussing are effected by means of an auxiliary system using a retractable prism K and a periscopic viewfinder (not shown) for direct visual observation through the objective lens. One of several objective lenses is selected from a lens turret to suit the field or event being photographed.

A low speed capping shutter L, rotated to open position during focussing and framing, is operated once for each event, and to insure precise exposure during this operation it is mechanically connected to and synchronized with the rotating film table I and other shutter discs described in greater detail below.

Figure 4:
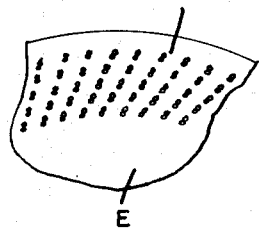
FIG. 4 is an enlarged view of a portion of the end of the image dissector matrix shown in FIG. 3 and taken along the plane 4—4 looking in the direction of the arrows.

In this embodiment as shown in FIG. 4 the large end E of the matrix B is circular. The fibers D at this end are arranged on channels across an annulus and these channels are inclined at an angle with respect to the radial in order to keep the width of the annulus at a minimum.

Adjacent the annulus and coaxial therewith are positioned two coupled shutter discs M, each of which is provided with identical slots (see FIG. 5) corresponding to the lines of fibers on the annulus. These shutter discs M rotate at different but synchronized speeds so that they cover and uncover the fiber lines periodically at a rate which is easily blanked by the relatively slow capping shutter L.

This shutter design is simple and reliable since the shutters can be rotated at a relatively slow speed and yet provide an extremely fast opening and closing time and short exposure time.

At the annulus on the large end of the matrix B an array of small field lens segments N is arranged to facilitate the collection of light by the reimaging lens H. During operation timing lights O with appropriate lenses P located behind transmission ports in the mirror G produce spark or streak images on the film plate F.

After a high speed photographic record has been made, the film plate F is removed, processed, and replaced.

A printing light source Q located beneath the table I is then turned on and the table I and shutter mechanisms L and M rotated to an indexed position which permits direct visual observation of the recorded images as reconstructed back through the image dissector matrix. By means of a light condenser system R the light from the source Q is directed through the transparent portion of the table I and directs the image that is on the photographic plate F back through the image dissector matrix B. The event is then reconstructed in slow motion by slowly rotating the table I.

To produce a cinematographic record of the high speed event previously photographed, essentially the same procedure as for visual display is followed. In this instance the 16 millimeter camera J is placed in front of the lens A with the shutter discs M engaged, and the printing light Q on. The movie camera drive is obtained from the main drive source of the photographic apparatus so that the cinematographic record is synchronized. The table is driven at a sufficiently low speed to insure adequate exposure at the movie camera.

Figure 5:
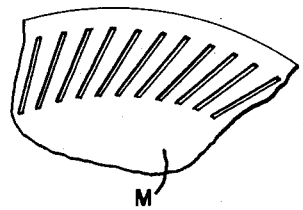
FIG. 5 is an enlarged view of a portion of the high speed shutter disc shown in FIG. 3 and taken along the plane 5—5 looking in the direction of the arrows.

By way of example, a typical photographic apparatus of the type illustrated in FIGS. 3–5 includes the following features. The small end of an image dissector matrix with a rectangular array of 535×400 25-micron fibers (a total of 214,000 fibers) measures 0.400 inch by 0.535 inch and requires a 1.33:1 reduction in size to the standard 16 millimeter reconstruction camera frame size. This produces a spacial resolution of 20 lines per millimeter on the reconstruction camera film. At the large end of the image dissector matrix five consecutive layers of 535 fibers each are arranged on each of 80 channels equally spaced at 4.5° intervals around an annulus. In order to keep the width of the annulus to a minimum each of the channels is inclined at 36° with respect to the radial to produce an annulus with a 9.78 inch outer radius and 7.65 inch inner radius. Each fiber at the inner radius subtends an angle of 0.0075° so that on the film plate 600 frames are possible between channel images spaced 4.5° apart. The overall length of the fiber matrix is about 10 inches.

By means of the reimaging lens H the annular matrix image is directed onto a film plate measuring 6.52 inches in diameter for a one-third size reduction, and with the film table rotating at 6250 r.p.m. a temporal resolution of $2 \times 10^{-7}$ seconds is achieved.

With one of the shutter discs M rotating at 420 r.p.m. and the other rotating at 35 r.p.m. the shutter disc combination when properly phased will permit an exposure of 120 microseconds only every $\frac{1}{60}$ of a second. Thus, a relatively low speed capping shutter L at the objective lens insures that only a single exposure of 600 frames is made.

Figure 6:
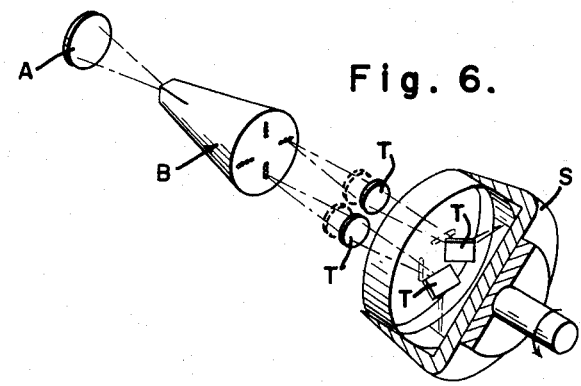
FIG. 6 is a perspective view of another embodiment of the present invention.

Referring now to FIG. 6 of the drawing there is shown another embodiment of the present invention using a fiber optics image dissector of the same general type as illustrated in FIGS. 1 and 2, but utilizing fewer fiber channels and a rotating hollow drum film holder. Each of the fiber channels is separately imaged onto the film in the rotating drum S using an individual lens and mirror system T. Reproduction can be made by a light source outside the rotating drum if the rotating drum is transparent.

While a large number of fibers can be arranged in a reasonably small space according to this arrangement, there is nowhere near the number of fibers possible in the arrangement shown in FIG. 1. Also, the separate lens systems and drum film holder are not as desirable as the structure of FIG. 1.

Figure 7:
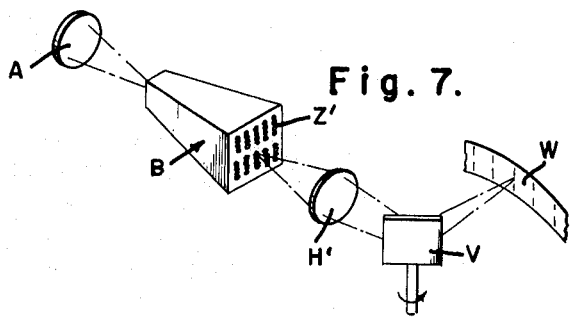
FIG. 7 is a perspective view of still another embodiment of the present invention.

Referring now to FIG. 7 in still another embodiment of the present invention the image dissector converts a rectangular fiber format to a sequence of channels on a surface E. The sequence is projected onto a strip film W by a rotating mirror V. The rotating mirror V scans the sequence image along the film and the information bearing channels are photographed on the film areas between adjacent projected information bearing channels.

The construction of the image dissector as shown in FIG. 7 is somewhat simpler than the type shown in FIG. 1, but the arrangement of the associated lens systems, film holders, and image reconstruction lamps makes the structure of FIG. 1 much more desirable.

While these and other details have been shown by way of illustration and example for the purpose of clarity of understanding, it is understood that certain changes and modifications can be made within the spirit of the invention as limited by the scope of the appended claims.

I claim:
1. A photographic apparatus for continuously photographing a high speed event comprising:
   (a) a light transmitting matrix composed of a plurality of light transmitting fibers,
      said fibers being arranged at the input end of said matrix substantially evenly thereacross and at the output end of said matrix in a sequence of channels;
   (b) a film plane;
   (c) means for projecting said sequence of channels on said film plane with film areas between said channels; and
(d) means producing relative motion between said output end of said matrix and said film plane for scanning said sequence along said film plane over said film areas to record each of the channel images on one of said film areas.

2. The photographic apparatus of claim 1 characterized further in that at said output end of said matrix said sequence of channels is arranged in a circle with said channels substantially equally spaced around said circle.

3. The photographic apparatus of claim 1 characterized further in that at said output end of said matrix said sequence of channels is arranged in a straight line with said channels substantially equally spaced along said straight line.

4. A photographic apparatus for continuously photographing a high speed event comprising:
(a) a light transmitting matrix composed of a plurality of light transmitting fibers adapted to send or receive an image at each end of said matrix,
said fibers being arranged at the first end of said matrix in closely abutting relationship and at the second end of said matrix in a sequence of spaced apart channels;
(b) a photographic film;
(c) means for optically aligning said fiber channels with different portions of said photographic film,
said different portions of said photographic film being spaced apart by film area; and
(d) rotating means for causing each of said fiber channels to be scanned over a different film area whereby a temporal sequence of images of said event can be recorded or reproduced with said photographic film.

5. The photographic apparatus of claim 4 characterized further in that at said output end of said matrix said sequence of said channels is arranged in a circle with said channels substantially equally spaced around said circle and each of said channels is made up of a row of said fibers one fiber in width.

6. The photographic apparatus of claim 4 characterized further in that at said output end of said matrix said sequence of said channels is arranged in a straight line with said channels substantially equally spaced along said straight line and each of said channels is made up of a row of said fibers one fiber in width.

7. A photographic apparatus for continuously photographing a high speed event comprising:
(a) a light transmitting matrix composed of a plurality of light transmitting fibers adapted to send or receive an image at each end of said matrix,
said fibers being arranged at the first end of said matrix in closely abutting relationship and at the second end of said matrix in a sequence of channels,
said channels being substantially equally spaced around a circle and each of said channels being made up of a row of fibers one fiber in width;
(b) objective lens means for directing an image of an event to be recorded onto said first end of said matrix;
(c) a photographic film;
(d) a flat circular film holder table for holding said photographic film to receive or send the channel images respectively sent or received at said second end of said matrix;
(e) means for projecting said channel images between said second end of said matrix and said photographic film on said table with film areas between said channel images on said film; and
(f) means producing relative motion between said output end of said matrix and said film for scanning said sequence along said film over said film areas to record or reproduce each of the channel images at one of said film areas.

8. The photographic apparatus of claim 7 characterized further in that said means for producing relative motion between said matrix and said film includes means for rotating said table about an axis perpendicular to the flat surface thereof.

9. The photographic apparatus of claim 8 characterized further in that said portion of said table on which said channel images are projected is transparent and including a printing light source and lens means behind said transparent portion of said table whereby printing light can be shown through developed film positioned on said table for reconstructing the event back through said matrix.

10. The photographic apparatus of claim 7 including a first shutter disc having slots therein corresponding to said fiber channels on said matrix, a second shutter disc having slots therein corresponding to the slots in said first shutter, and means for rotating said shutters coaxial with said circle of channels and at different rotational speeds.

11. A photographic apparatus for continuously photographing a high speed event comprising:
(a) a light transmitting matrix composed of a plurality of light transmitting fibers,
said fibers being arranged at the input end of said matrix substantially evenly thereacross and at the output end of said matrix in a sequence of channels;
(b) a film plane;
(c) means for projecting said sequence of channels on said film plane with film areas between said channels; and
(d) rotating means for moving said film plane in a direction substantially transverse to the length of said channels to record each of the channel images on one of said film areas.

References Cited by the Examiner

UNITED STATES PATENTS

| | | | |
|---|---|---|---|
| 2,382,617 | 8/1945 | Del Riccio | 96—27 |
| 2,596,740 | 5/1952 | Tuttle et al. | 352—81 |
| 2,618,195 | 11/1952 | Herman | 352—39 |
| 2,663,217 | 12/1953 | Tuttle et al. | 88—14 |
| 2,939,362 | 6/1960 | Cole | 352—105 |
| 2,943,533 | 7/1960 | Goodbar | 352—83 |
| 3,027,219 | 3/1962 | Bradley | 346—110 |

FOREIGN PATENTS 780,976    8/1957    Great Britain.

JOHN M. HORAN, *Primary Examiner.*

WILLIAM MISIEK, *Examiner.*